(12) United States Patent
Zhou et al.

(10) Patent No.: US 11,409,364 B2
(45) Date of Patent: Aug. 9, 2022

(54) INTERACTION WITH ARTIFICIAL REALITY BASED ON PHYSICAL OBJECTS

(71) Applicant: Facebook Technologies, LLC, Menlo Park, CA (US)

(72) Inventors: Qian Zhou, Redmond, WA (US); Kenrick Cheng-Kuo Kin, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/892,987

(22) Filed: Jun. 4, 2020

(65) Prior Publication Data

US 2021/0081050 A1    Mar. 18, 2021

Related U.S. Application Data

(60) Provisional application No. 62/900,002, filed on Sep. 13, 2019.

(51) Int. Cl.
| | |
|---|---|
| *G06F 3/01* | (2006.01) |
| *G06V 20/20* | (2022.01) |
| *G06V 40/20* | (2022.01) |
| *G06V 40/10* | (2022.01) |

(52) U.S. Cl.
CPC .............. *G06F 3/017* (2013.01); *G06F 3/011* (2013.01); *G06V 20/20* (2022.01); *G06V 40/107* (2022.01); *G06V 40/28* (2022.01)

(58) Field of Classification Search
CPC combination set(s) only.
See application file for complete search history.

(56) References Cited

U.S. PATENT DOCUMENTS

| | | | | |
|---|---|---|---|---|
| 8,542,907 | B2 * | 9/2013 | Zalewski | A63F 13/812 382/154 |
| 8,836,768 | B1 * | 9/2014 | Rafii | G06F 3/0304 348/47 |
| 9,383,895 | B1 * | 7/2016 | Vinayak | G06F 3/04883 |
| 9,829,986 | B2 * | 11/2017 | Yun | G06F 3/0304 |
| 10,288,419 | B2 * | 5/2019 | Abovitz | G02B 27/0101 |
| 10,614,468 | B2 * | 4/2020 | Vedula | G06Q 30/016 |
| 10,866,093 | B2 * | 12/2020 | Abovitz | G16H 40/67 |

(Continued)

OTHER PUBLICATIONS

Achibet et al., The virtual mitten: a novel interaction paradigm for visuo-haptic manipulation of objects using grip force; pp. 1-8, IEEE symposium on 3D User Interfaces 2014 (Year: 2014).*

(Continued)

*Primary Examiner* — Motilewa Good-Johnson
(74) *Attorney, Agent, or Firm* — Foley & Lardner LLP

(57) ABSTRACT

Disclosed herein are related to a system and a method for controlling a virtual reality based on a physical object. In one aspect, a shape of a hand of a user corresponding to a surface or a structure of a physical object is detected. In one aspect, according to the detected shape of the hand, an interactive feature for the surface or the structure of the physical object is generated in a virtual reality or augmented reality application. In one aspect, a user interaction with the interactive feature is detected. In one aspect, an action of the virtual reality or augmented reality application is initiated, in response to detecting the user interaction with the interactive feature.

20 Claims, 15 Drawing Sheets

(56) References Cited

U.S. PATENT DOCUMENTS

| | | | | |
|---|---|---|---|---|
| 2005/0264527 A1* | 12/2005 | Lin | ......................... | G06F 3/011 345/156 |
| 2006/0284837 A1* | 12/2006 | Stenger | .............. | G06K 9/00375 345/156 |
| 2008/0013793 A1* | 1/2008 | Hillis | ................... | G03H 1/0005 382/114 |
| 2010/0199232 A1* | 8/2010 | Mistry | ................... | G06F 3/0425 715/863 |
| 2012/0038549 A1* | 2/2012 | Mandella | ................ | G06F 3/011 345/156 |
| 2012/0249741 A1* | 10/2012 | Maciocci | .............. | G06T 15/503 348/46 |
| 2013/0211843 A1* | 8/2013 | Clarkson | ............. | G06F 3/04883 704/275 |
| 2015/0234477 A1* | 8/2015 | Abovitz | ................ | A63F 13/428 382/103 |
| 2015/0248787 A1* | 9/2015 | Abovitz | ............. | G02B 27/4227 345/633 |
| 2015/0363034 A1* | 12/2015 | Hinckley | ................ | G06F 3/017 345/173 |
| 2016/0187974 A1* | 6/2016 | Mallinson | ........... | A63F 13/5255 463/32 |
| 2016/0364003 A1* | 12/2016 | O'Brien | ................ | G03H 1/0005 |
| 2017/0278304 A1* | 9/2017 | Hildreth | ............. | G02B 27/0172 |
| 2019/0188460 A1* | 6/2019 | Zhang | ................ | G06K 9/00214 |
| 2020/0341538 A1* | 10/2020 | Zhu | ...................... | A63H 33/102 |

OTHER PUBLICATIONS

Hettiarachchi et al., Annexing reality: enabling opportunistic use of everyday objects as tangible proxies in augmented reality, pp. 1957-1967, ACM 2016 (Year: 2016).*

* cited by examiner

INTERACTION WITH ARTIFICIAL REALITY BASED ON PHYSICAL OBJECTS

CROSS-REFERENCE TO RELATED APPLICATION

This application claims priority to and the benefit of U.S. Provisional Application No. 62/900,002, filed Sep. 13, 2019, entitled "INTERACTION WITH ARTIFICIAL REALITY BASED ON PHYSICAL OBJECTS", which is incorporated herein by reference in its entirety for all purposes.

FIELD OF DISCLOSURE

The present disclosure is generally related to an interface for an artificial reality, including but not limited to generating interactive features for interacting with the artificial reality based on physical objects.

BACKGROUND

An artificial reality such as a virtual reality (VR), an augmented reality (AR), or a mixed reality (MR) provides immersive experience to a user. In one example, a movement of a user wearing a head wearable display (HWD) can be detected, and an image of an artificial reality corresponding to the movement can be rendered. For example, a user wearing the HWD can turn his head to the left, and an image of a virtual object corresponding to a location and an orientation of the HWD and/or a gaze direction of the user can be displayed on the HWD to allow the user to feel as if the user is moving within a space of an artificial reality (e.g., a VR space, an AR space, or a MR space).

In one implementation, a user input can be provided through dedicated hardware or an electronic input device to enhance the artificial reality experience. Examples of the dedicated hardware include a joystick, a controller, a pointing device (e.g., a mouse), a keyboard, or a combination of them. For example, a user can trigger an action in the artificial reality or change how the artificial reality is rendered through the dedicated hardware. However, relying on the dedicated hardware for controlling the artificial reality can degrade the user experience. For example, carrying such dedicated hardware or locating the dedicated hardware while the user is experiencing the artificial reality can be disruptive.

SUMMARY

Various embodiments disclosed herein are related to a system for a virtual reality or an augmented reality. In some embodiments, the system includes a processor configured to detect a shape of a hand of a user corresponding to a surface or a structure of a physical object. In some embodiments, the processor is further configured to generate, according to the detected shape of the hand, an interactive feature for the surface or the structure of the physical object, in a virtual reality or augmented reality application. In some embodiments, the processor is further configured to detect a user interaction with the interactive feature. In some embodiments, the processor is further configured to initiate an action of the virtual reality or augmented reality application, in response to detecting the user interaction with the interactive feature.

In some embodiments, the processor is configured to generate, according to the detected shape (e.g., pose, gesture, grip, posture, skeletal structure) of the hand, the interactive feature for the surface or the structure of the physical object, in the virtual reality or augmented reality application by detecting a hand template of a plurality of hand templates closest to the detected shape of the hand, and generating the interactive feature according to the hand template. In some embodiments, the system further includes a storage configured to store mapping between the plurality of hand templates and corresponding interactive features. In some embodiments, the processor is configured to determine the interactive feature for the surface of the structure of the physical object according to the mapping. In some embodiments, the processor is configured to generate, according to the detected shape of the hand, the interactive feature for the surface or the structure of the physical object, in the virtual reality or augmented reality application by detecting a predetermined interaction of the user associated with the determined physical object, and activating the interactive feature, in response to detecting the predetermined interaction associated with the physical object.

In some embodiments, the predetermined interaction is a drawing motion of a mark using another hand of the user relative to the surface of the physical object. In some embodiments, the processor is configured to activate the interactive feature by generating an image of a virtual button corresponding to the surface or the structure of the physical object, in response to detecting the drawing motion of the mark, and overlaying the image of the virtual button on the surface or the structure of the physical object.

In some embodiments, the predetermined interaction comprises a tap by a finger of the hand on the surface of the physical object. In some embodiments, the processor is configured to detect the user interaction with the interactive feature by tracking a position of the finger of the hand with respect to a location of the tap on the surface of the physical object.

In some embodiments, the predetermined interaction includes pulling a trigger of the physical object a specific number of times within a predetermined time. In some embodiments, the processor is configured to detect the user interaction with the interactive feature by detecting whether the hand performs a motion to pull the trigger of the physical object.

Various embodiments disclosed herein are related to a method for a virtual reality or an augmented reality. In some embodiments, the method includes detecting a shape of a hand of a user corresponding to a surface or a structure of a physical object. In some embodiments, the method includes generating, according to the detected shape of the hand, an interactive feature for the surface or the structure of the physical object, in a virtual reality or augmented reality application. In some embodiments, the method includes detecting a user interaction with the interactive feature. In some embodiments, the method includes initiating an action of the virtual reality or augmented reality application, in response to detecting the user interaction with the interactive feature.

In some embodiments, generating, according to the detected shape of the hand, the interactive feature for the surface or the structure of the physical object, in the virtual reality or augmented reality application includes detecting a hand template of a plurality of hand templates closest to the detected shape of the hand, and generating the interactive feature according to the hand template. In some embodiments, the method includes storing mapping between the plurality of hand templates and corresponding interactive features. In some embodiments, the interactive feature for the surface of the structure of the physical object is determined according to the mapping. In some embodiments, generating, according to the detected shape of the hand, the interactive feature for the surface or the structure of the physical object, in the virtual reality or augmented reality application includes detecting a predetermined interaction of the user associated with the physical object, and activating the interactive feature, in response to detecting the predetermined interaction associated with the physical object.

In some embodiments, the predetermined interaction is a drawing motion of a mark using another hand of the user on or relative to the surface of the physical object. In some embodiments, activating the interactive feature includes generating an image of a virtual button corresponding to the surface or the structure of the physical object, in response to detecting the drawing motion of the mark using the another hand of the user, and overlaying the image of the virtual button on the surface or the structure of the physical object.

In some embodiments, the predetermined interaction includes a tap by a finger of the hand on the surface of the physical object. In some embodiments, detecting the user interaction with the interactive feature includes tracking a position of the finger of the hand with respect to a location of the tap on the surface of the physical object.

In some embodiments, the predetermined interaction includes pulling a trigger of the physical object twice within a predetermined time period. In some embodiments, detecting the user interaction with the interactive feature includes detecting whether the hand performs a motion to pull the trigger of the physical object.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to systems and methods for providing a virtual interface for interacting with an artificial reality based on a physical object or a tangible object. In some embodiments, a shape (e.g., pose, surface, volume) of a hand of a user experiencing a virtual reality or augmented reality application is detected. The hand of the user may be formed according to a surface or a structure of the physical object. According to the detected shape of the hand, an interactive feature for the surface or the structure of the physical object is generated in the virtual reality or augmented reality application. An interactive feature may include a virtual button overlaid on the physical object or other virtual object or interface that allows for an interaction of the user associated with a particular part of the physical object or the space around the physical object. A user interaction with the interactive feature may be detected, and an action of the virtual reality or augmented reality application can be initiated, in response to detecting the user interaction with the interactive feature. Advantageously, the disclosed systems and methods can enable a virtual interface to be generated using a physical object, and can allow the user to control or interact with the virtual reality or augmented reality application without a dedicate hardware or an electronic input device.

Figure 1:
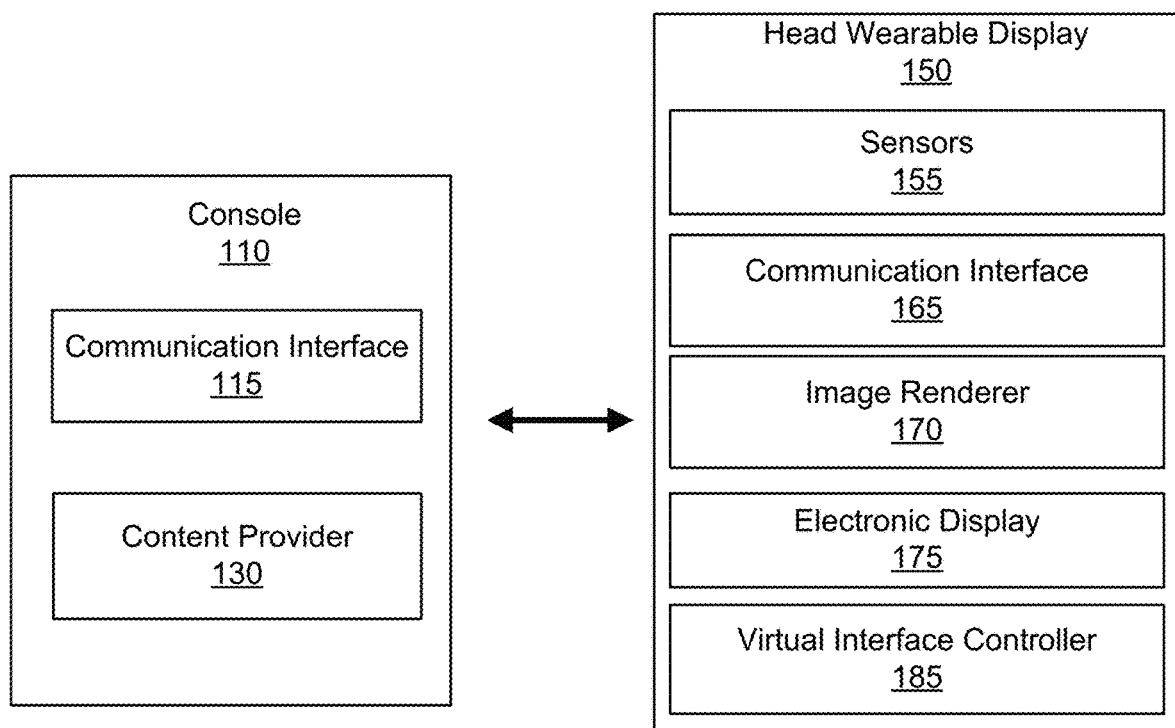
FIG. 1 is a diagram of a system environment including an artificial reality system, according to an example implementation of the present disclosure.

FIG. 1 is a block diagram of an example artificial reality system environment 100 in which a console 110 operates. In some embodiments, the artificial reality system environment 100 includes a HWD 150 worn by a user, and a console 110 providing content of an artificial reality to the HWD 150. The HWD 150 may be referred to as, include, or be part of a head mounted display (HMD), head mounted device (HMD), head wearable device (HWD), head worn display (HWD) or head worn device (HWD). In one aspect, the HWD 150 may detect its location and an orientation of the HWD 150 and/or a gaze direction of the user wearing the HWD 150, and can provide the detected location and orientation of the HWD 150 and/or the gaze direction to the console 110. The console 110 may determine a view within the space of the artificial reality corresponding to the detected location and orientation and/or the gaze direction, and generate an image depicting the determined view. The console 110 may provide the image to HWD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 includes or corresponds to an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, a communication interface 165, an image renderer 170, an electronic display 175, and/or a virtual interface controller 185. These components may operate together to detect a location and an orientation of the HWD 150 and/or a gaze direction of the user wearing the HWD 150, and can render an image of a view within the artificial reality corresponding to the detected location and orientation of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location, an orientation of the HWD 150, and/or a gaze direction of the user. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the imaging sensors can capture an image for detecting a physical object, a user gesture, a shape of the hand, a user interaction, etc. In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction. In one aspect, according to the location and the orientation of the HWD 150, a gaze direction of the user can be determined or estimated.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a universal serial bus (USB), Ethernet, Firewire, high-definition multimedia interface (HDMI), or any wired communication link. In the embodiments, in which the console 110 and the head mounted display 150 are implemented on a single system, the communication interface 165 may communicate with the console 110 through at least a bus connection or a conductive trace. Through the communication link, the communication interface 165 may transmit to the console 110 data indicating the determined location of the HWD 150 and the orientation of the HWD 150 and/or the gaze direction of the user. Moreover, through the communication link, the communication interface 165 may receive from the console 110 data indicating image to be rendered.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. In one aspect, the image renderer 170 receives the compressed image from the console 110, and decompresses the compressed image, such that a communication bandwidth between the console 110 and the HWD 150 can be reduced. In one aspect, the process of detecting, by the HWD 150, the location of the HWD 150, the orientation of the HWD and/or the gaze direction of the user wearing the HWD 150, and generating and transmitting, by the console 110, a high resolution image (e.g., 1920 by 1080 pixels) corresponding to the detected location, the orientation, and/or the gaze direction to the HWD 150 may be computationally exhaustive and may not be performed within a frame time (e.g., less than 11 ms). In one aspect, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the virtual interface controller 185 is a component that generates a virtual interface based on a physical object. In one approach, the virtual interface controller 185 allows a user to utilize a physical object or a tangible object to control or modify a virtual reality or augmented reality application. In one approach, the virtual interface controller 185 detects a user gesture or a shape of a hand of the user associated with a physical object, and generates an interactive feature for the physical object in the virtual reality or augmented reality application according to the detected user gesture or the detected shape of the hand. In one example, an interactive feature is a virtual button or other object (e.g., a user interface element) overlaid on the physical object. In another example, an interactive feature includes or is related to an interaction of the user using a particular part of the physical object, such as a user pulling a trigger of a sprayer. The virtual interface controller 185 may detect a user interaction with the interactive feature, and initiate an action in the virtual reality or augmented reality application, in response to detecting the user interaction with the interactive feature. For example, a setting of the virtual reality or augmented reality application can be adjusted, or an input can be applied to the virtual reality or augmented reality application, according to the detected user interaction with the interactive feature. Advantageously, the user can control the virtual reality or augmented reality application without dedicated hardware or an electronic input device. Detailed descriptions on the examples of generating a virtual interface and operating the virtual reality or augmented reality application through the virtual interface are provided below with respect to FIGS. 3 through 8.

In some embodiments, the console 110 is an electronic component or a combination of an electronic component and a software component that provides content to be rendered through the HWD 150. In one aspect, the console 110 includes a communication interface 115 and a content provider 130. These components may operate together to determine a view of the artificial reality corresponding to the location of the HWD 150, the orientation of the HWD 150, and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150 as a single device.

In some embodiments, the communication interface 115 is an electronic component or a combination of an electronic component and a software component that communicates with the HWD 150. The communication interface 115 may be a counterpart component to the communication interface 165 to communicate through a communication link (e.g., USB cable). Through the communication link, the communication interface 115 may receive from the HWD 150 data indicating the determined location of the HWD 150, the orientation of the HWD 150, and/or the determined gaze direction of the user. Moreover, through the communication link, the communication interface 115 may transmit to the HWD 150 data describing an image to be rendered.

The content provider 130 is a component that generates content to be rendered according to the location of the HWD 150, the orientation of the HWD 150, and/or the gaze direction of the user of the HWD 150. In one aspect, the content provider 130 determines a view of the artificial reality according to the location of the HWD 150, the orientation of the HWD 150, and/or the gaze direction of the user of the HWD 150. For example, the content provider 130 maps the location of the HWD 150 in a physical space to a location within a virtual space, and determines a view of the virtual space along a direction corresponding to the orientation of the HWD 150 and the gaze direction from the mapped location in the virtual space. The content provider 130 may generate image data describing an image of the determined view of the virtual space, and transmit the image data to the HWD 150 through the communication interface 115. In some embodiments, the content provider 130 generates metadata including motion vector information, depth information, edge information, object information, etc., associated with the image, and transmits the metadata with the image data to the HWD 150 through the communication interface 115. The content provider 130 may compress and/or encode the data describing the image, and can transmit the compressed and/or encoded data to the HWD 150. In some embodiments, the content provider 130 generates and provides the image to the HWD 150 periodically (e.g., every 11 ms).

Figure 2:
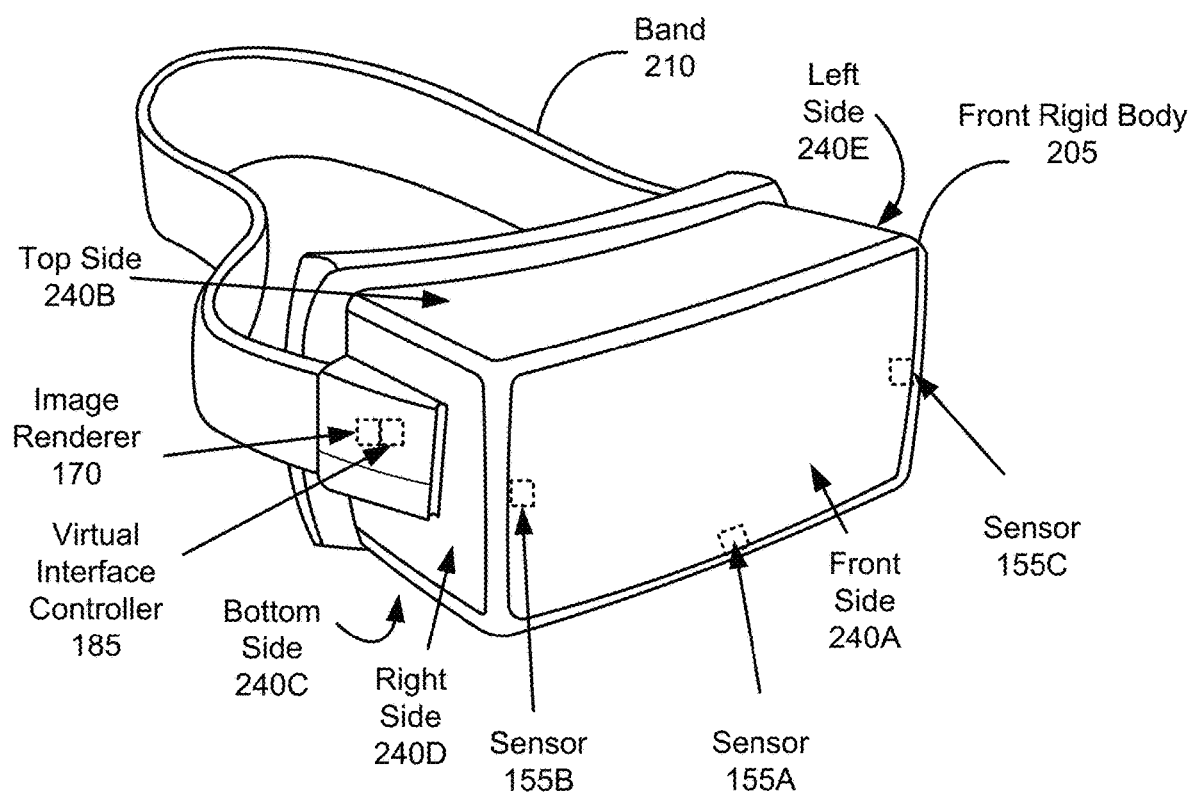
FIG. 2 is a diagram of a head mounted display, according to an example implementation of the present disclosure.

FIG. 2 is a diagram of the HWD 150, in accordance with an example embodiment. In some embodiments, the HWD 150 includes a front rigid body 205 and a band 210. The front rigid body 205 includes the electronic display 175 (not shown in FIG. 2), the sensors 155A, 155B, 155C, the image renderer 170, and virtual interface controller 185. The sensor 155A may be an accelerometer, a gyroscope, a magnetometer, or another suitable type of sensor that detects motion and/or location. The sensors 155B, 155C may be imaging sensors that capture images for detecting a physical object, a user gesture, a shape of a hand, a user interaction, etc. In other embodiments, the HWD 150 has a different configuration than shown in FIG. 2. For example, the image renderer 170, and/or the sensors 155A, 155B, 155C may be disposed in different locations than shown in FIG. 2.

Figure 3:
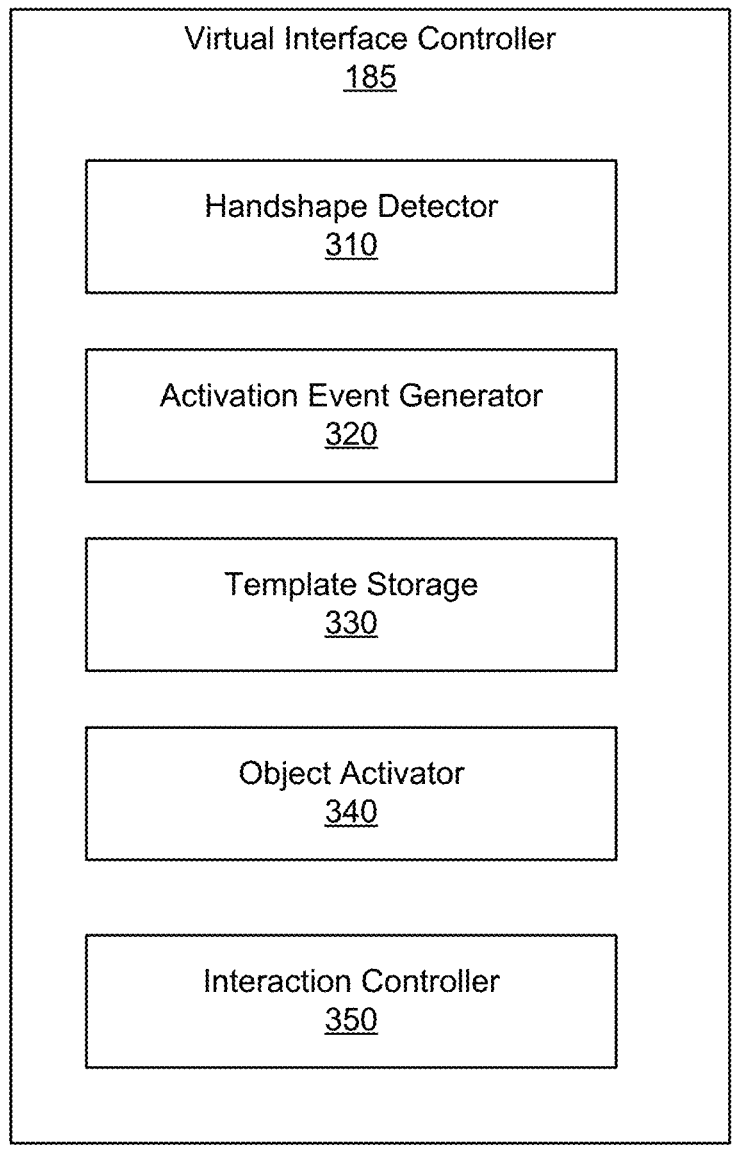
FIG. 3 is a diagram of a virtual interface controller, according to an example implementation of the present disclosure.
Figure 4A:
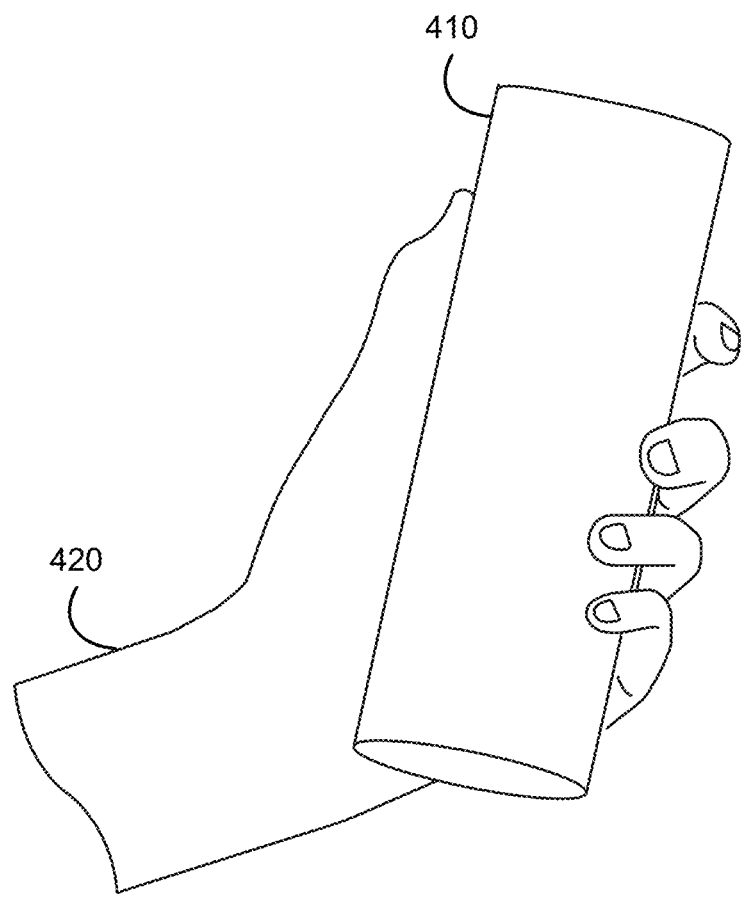
FIGS. 4A-4D show an example process of generating a virtual interface on a cylindrical physical object, according to an example implementation of the present disclosure.
Figure 4B:
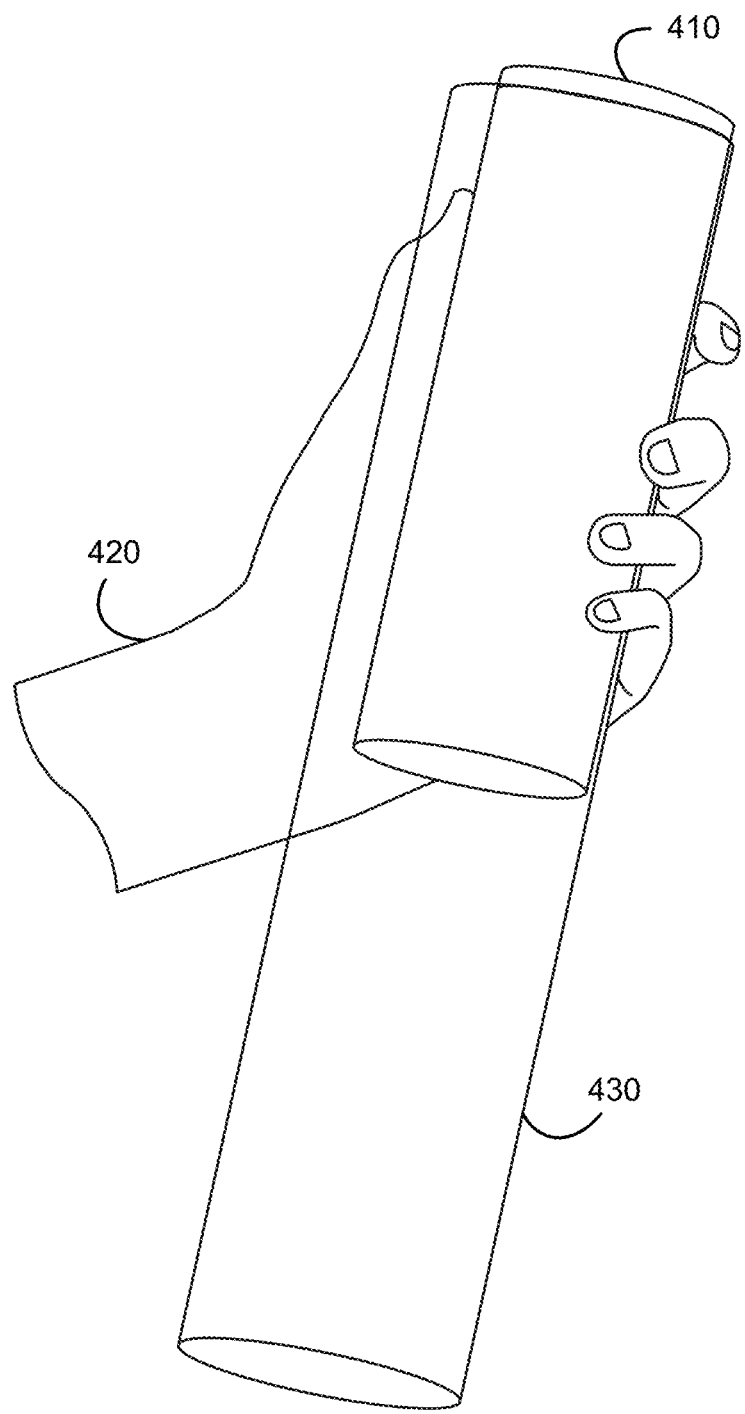
Figure 4C:
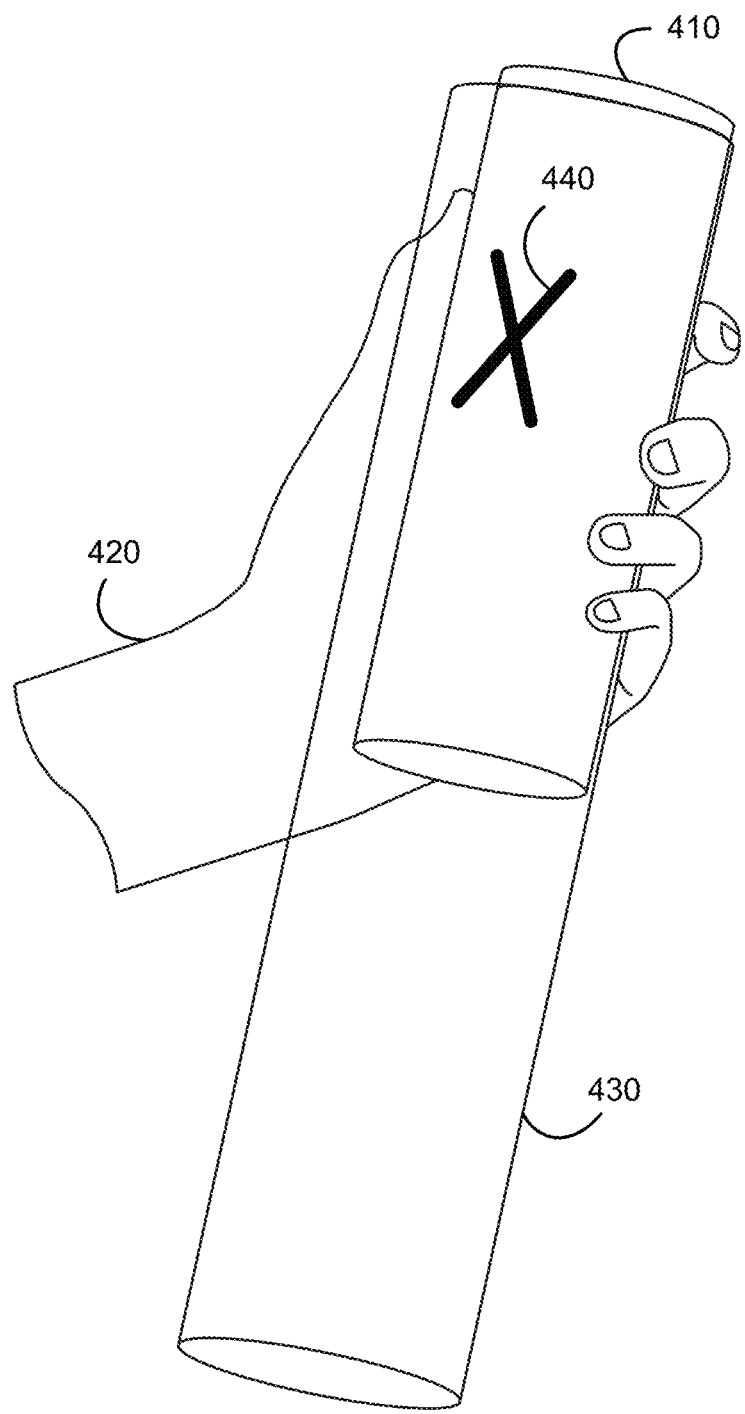
Figure 4D:
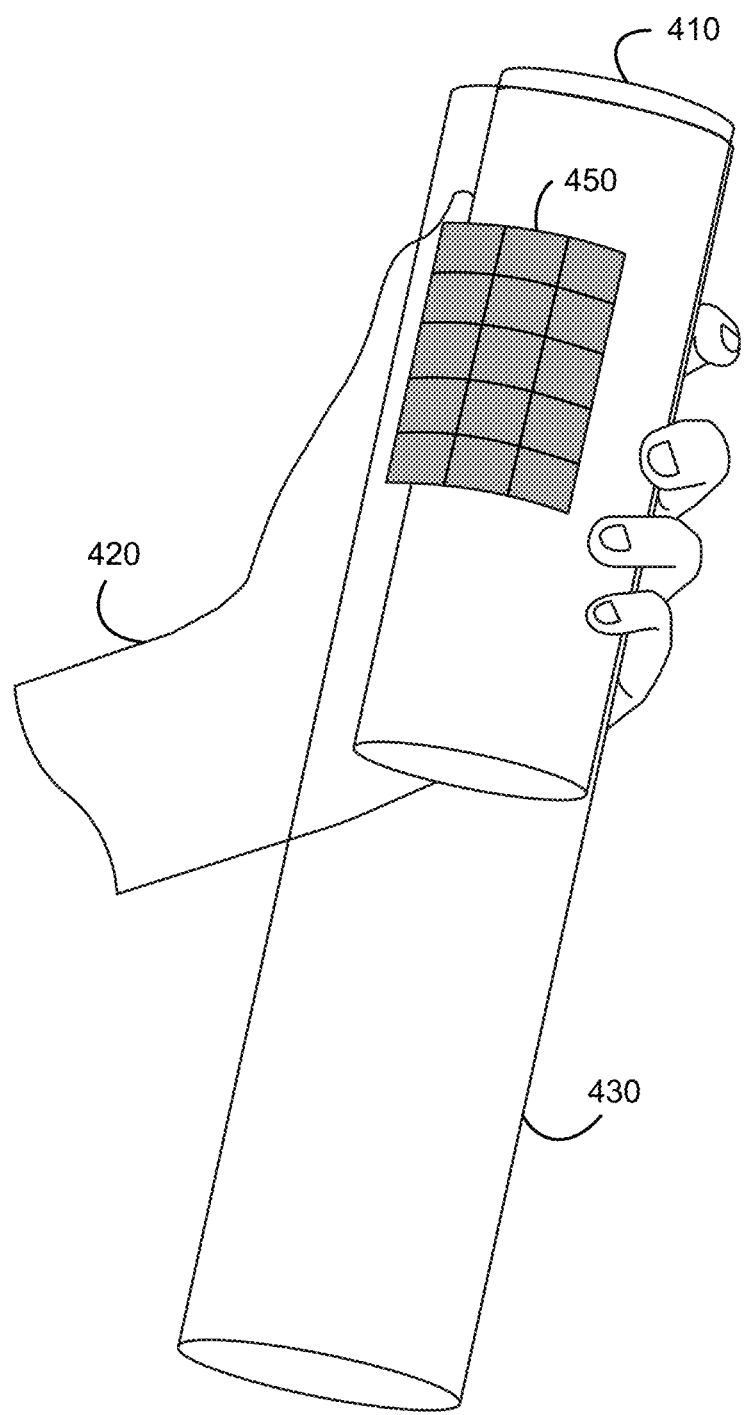

FIG. 3 is an example diagram of the virtual interface controller 185 of FIG. 1, according to an example implementation of the present disclosure. In some embodiments, the virtual interface controller 185 includes a handshape detector 310, an activation event generator 320, a template storage 330, an object activator 340, and an interaction controller 350. These components may operate together to detect a user gesture or a shape of a hand of the user associated with a physical object, and generate a virtual interface for controlling a virtual reality or augmented reality application according to the detected user gesture or the shape of the hand. In some embodiments, the virtual interface controller 185 is implemented as hardware, software, or a combination of hardware and software. In some embodiments, the virtual interface controller 185 is implemented as a processor and a non-transitory computer readable medium storing instructions when executed by the processor cause the processor to perform various processes disclosed herein. In other embodiments, the virtual interface controller 185 includes more, fewer, or different components than shown in FIG. 3.

In some embodiments, the handshape detector 310 is or includes a component that detects a handshape of a user (e.g., shape, grip or posture of a hand of the user). The handshape detector 310 may perform image processing on one or more images of a user hand captured by one or more imaging sensors 155 to detect a handshape. In one configuration, the handshape detector 310 is electrically coupled to one or more imaging sensors that capture an image from the perspective of the HWD 150, which may correspond to the perspective of the user of the HWD 150. The handshape detector 310 may receive one or more images from the imaging sensors, and can identify and/or track a hand of the user to determine a shape of the hand. For example, the handshape detector 310 determines or extracts an outline and/or features of the hand from the received image, and tracks a shape of the hand according to the outline and/or features. In one configuration, the handshape detector 310 is communicatively coupled to one or more sensors (e.g., an accelerometer, a gyroscope, a magnetometer, etc.) attached to a glove worn by a user of the HWD 150, and receives a signal indicating sensor measurements (e.g., translational movements and/or rotational movements of different parts of the glove) through a communication link (e.g., a wireless link or a wired link). According to the signal indicating the sensor measurements, the handshape detector 310 may determine a location, an orientation, and/or a shape of the glove. In one configuration, the handshape detector 310 is communicatively coupled to one or more electromyography (EMG) sensors worn by a hand or a forearm of a user of the HWD 150, and receives a signal indicating sensor measurements (e.g., translational movements and/or rotational movements of different parts of the hand measured by the EMG sensors) through a communication link (e.g., a wireless link or a wired link). The handshape detector 310 may determine a location, an orientation, and/or a shape of the hand according to the sensor measurements. In some embodiments, the handshape detector 310 can save, store or bookmark a handshape as a handshape template, in a library or database of handshape templates for instance. The library can describe or represent various grips for specific object shapes, interactions and/or use cases. For example, a particular user might have a hand wallet that the user regularly holds in a particular grip. That particular grip can be saved so in the future, if that specific grip pose is detected, then it is associated with the holding of that hand wallet (e.g., refit the wallet surface to the estimated contact points on the hand) and can be tied to a particular application when activated.

In some embodiments, the activation event generator 320 is or includes a component that determines or selects a handshape template, from a plurality of handshape templates, closest to the detected handshape, and generates or determines an activation event. In one aspect, each template corresponds to a shape or a surface of a corresponding object. The template storage 330 may store a plurality of handshape templates for different types of objects. For example, a first template corresponds to a shape of a hand holding a cylindrical object, a second template corresponds to a shape of a hand holding a box-shape (or a book-shape) object, a third template corresponds to a shape of a hand holding a pen-shape object, a fourth template corresponds to a shape of a hand holding a sprayer-shape object, and a fifth template corresponds to a sphere-shape object (e.g., a ball, an apple, etc.). The activation event generator 320 may compare the detected handshape with the hand templates to identify or determine a hand template closest to the handshape, and determine or estimate a structure, shape, type or a surface of the physical object being held according to the determined hand template. In some embodiments, the activation event generator 320 determines a dimension (e.g., size, width, height, length, diameter, etc.) of the physical object, a location of the physical object, an orientation of the physical object, according to the detected shape or the hand template. In some embodiments, where the size of the object is known or predetermined, the activation event generator 320 may determine the location, position and/or orientation of the physical object. In certain embodiments, the activation event generator 320 may determine the size of the physical object, as well as the object's location, position and/or orientation.

Moreover, the activation event generator 320 may generate or determine an activation event corresponding to the hand template. An activation event may be a predetermined interaction by a user with a structure or a surface of a physical object that allows or causes an interactive feature to be generated. For example, an activation event may be a user providing a gesture of drawing a mark, such as a "+" sign or a cross mark, on a surface of a cylindrical shape object or a box-shape object. For another example, an activation event may be a user tapping a tip of a pen-shape object twice (or some other number of times) within a predetermined time (e.g., 1 second). For another example, an activation event may be a user pulling a trigger of a sprayer-shape object twice within a predetermined time (e.g., 1 second).

In some embodiments, the object activator 340 is or includes a component that detects one or more activation events associated with the structure or the surface of the physical object and generates or activates one or more virtually created interactive features for the structure or the surface of the physical object, in response to detecting the one or more activation events. The object activator 340 may perform image processing on one or more images of a user hand captured by one or more imaging sensors 155 to detect one or more activation events. In one aspect, an interactive feature is a virtually created interface (or a virtual interface) that allows a user to trigger an action in a virtual reality or augmented reality application or change how the virtual reality or augmented reality application is rendered. The virtual interface may be visible or invisible to the user. In one example, a visible virtual interface includes a virtual button, a virtual keyboard, a virtual pad or other user interface object overlaid on a physical object. In one example, a non-visible virtual interface includes an interaction of the user associated with a particular part of the physical object, such as a user pulling a trigger of a sprayer, or a location and/or direction of a finger with respect to a physical object.

In one example, the object activator 340 determines an active region, on which to overlay a virtual button, a virtual keyboard, or a virtual pad, in response to detecting the user drawing the cross mark or the plus sign (e.g., "+" sign) along a surface of the physical object. The object activator 340 may perform image processing on an image captured by one or more imaging sensors 155 to detect a user interaction on a surface of the physical object. In one approach, the object activator 340 determines the position, size, and/or orientation of an active region as well as the flatness or curvature of the physical object, according to the trajectory of the user drawing the cross mark. In one example, the object activator 340 may determine four ends of the cross mark to be four corners of the active region or four ends of the cross mark to be on sides of the active region. In one example, the object activator 340 detects a three-point activation, such as a user tapping three or more corners of a polygon on a surface of the physical object as an activation event. The object activator 340 can determine depth/position of the polygon as well as its normal according to the locations of the taps, and then determine an active region according to the determined depth/position of the polygon as well as its normal. The object activator 340 may generate virtual keys, buttons, or pads to fit in the active region, and overlay the virtual keys, buttons, or pads on the active region. In some embodiments, if the active region is too small, the object activator 340 can extend the active area to mid-air, but may be locked relative to where the inferred object is, for instance. For example, in a 4 row×4 column grid of buttons, a 4 row×3 column grid fits on the object and a 4 row×1 column grid fits as mid-air buttons to the side of the grip, to enable comfortable user interaction by a user. In some embodiments, the active region is predetermined, and is overlaid on a surface of the physical object at a location of a tap or a cross point of the cross mark.

In one example, the object activator 340 detects a reference point on a physical object (e.g., pen). For example, the object activator 340 may detect a user tapping a pen two or more times in a predetermined duration, and determines a location of the taps to be a reference point. The object activator 340 may track a location or a direction of a finger (e.g., thumb) with respect to the reference point to allow a user to provide a slide or swipe input.

The interaction controller 350 is or includes a component that detects a user interaction with an activated interactive feature of a physical object, and triggers an action in the virtual reality or augmented reality application or changes how the virtual reality or augmented reality application is rendered, according to the detected user interaction with the activated interactive feature. The interaction controller 350 may perform image processing on an image captured by one or more imaging sensors 155 to detect a user interaction on a surface of the physical object. For example, the interaction controller 350 determines whether a finger of the user presses a virtual button or a virtual pad, and inserts an indication of corresponding number or a corresponding character, in response to determining that the finger presses the virtual button or the virtual pad. For example, the interaction controller 350 determines a direction of the thumb with respect to a reference point (e.g., a tip) of a pen, and increases or decreases a volume of sound, or navigates through different content in the virtual reality or augmented reality application according to the direction of the thumb with respect to the pen. For example, the interaction controller 350 determines whether a trigger of a sprayer is pulled according to a tracked handshape with respect to the trigger or a body of the sprayer. In response to detecting the user pulling the trigger, the interaction controller 350 may project a bullet or a laser beam in a virtual reality or augmented reality game, or select an object or surface pointed by the sprayer. Advantageously, the interaction controller 350 allows a user to provide an input to trigger an action in the virtual reality or augmented reality application or change how the virtual reality or augmented reality application is rendered, through a virtually created interactive feature without relying on dedicated hardware or an electronic input device.

FIGS. 4A-4D show an example process of generating a virtual interface on a cylindrical physical object, according to an example implementation of the present disclosure. For example in FIG. 4A, a user holds a cylindrical object 410 (e.g., a can) with a first hand 420 (e.g., left hand). For example in FIG. 4B, the virtual interface controller 185 detects a shape of a hand, and compares the detected handshape with hand templates to identify or determine a hand template closest to the handshape. The virtual interface controller 185 may determine a structure or a surface of the cylindrical object 410 according to the determined hand template. The virtual interface controller 185 may generate an indicator 430 indicating that a user may perform an activation event to activate an interactive feature on a surface of the cylindrical object 410. The indicator 430 may be semi-transparent and may have a structure or a surface corresponding to the determined structure or the surface of the cylindrical object 410 overlaid on the cylindrical object 410. For example in FIG. 4C, the user may make a gesture of drawing a cross mark on the surface of the cylindrical object 410 with a second hand (e.g., right hand), while holding the cylindrical object 410 with the first hand. The virtual interface controller 185 may determine that an activation event associated with the cylindrical object 410 is drawing a cross mark 440 (or a "+" sign) using a particular finger (e.g., an index finger) of the other hand. The virtual interface controller 185 may track a finger (e.g., an index finger) of the second hand, and determine that the user made a gesture of drawing the cross mark on the surface of the cylindrical object 410. For example in FIG. 4D, the virtual interface controller 185 may generate virtual buttons 450, in response to the user interaction matching the activation event. The virtual interface controller 185 may generate the virtual buttons 450, at which the cross mark is drawn. Through the virtual buttons 450, the user may input numbers, characters to the virtual reality or augmented reality application.

Figure 5:
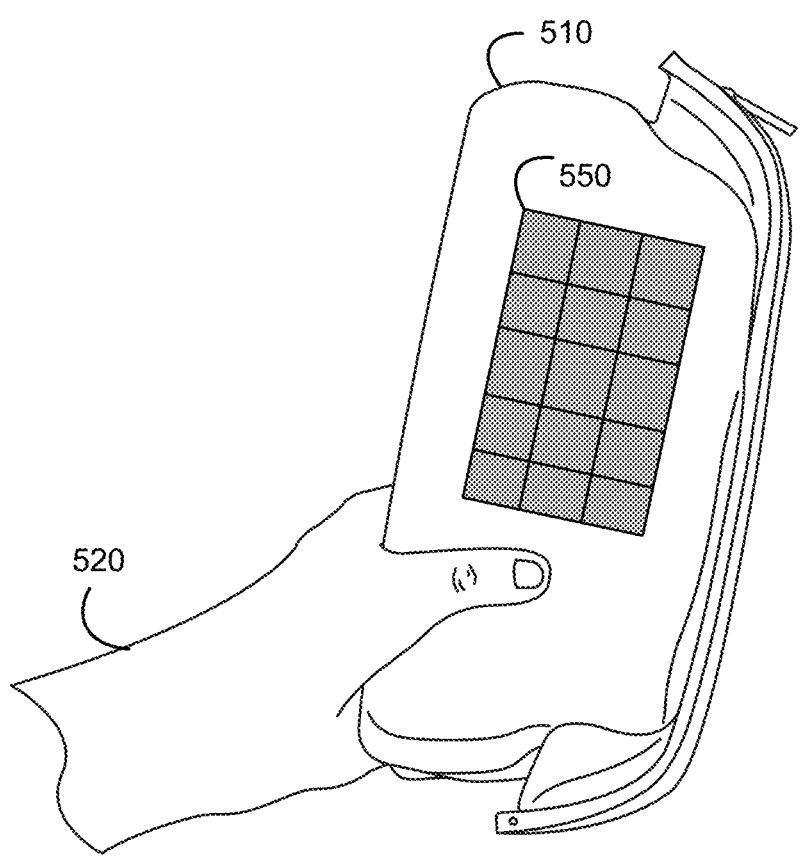
FIG. 5 shows an example virtual interface utilizing a box-shape physical object, according to an example implementation of the present disclosure.

FIG. 5 shows an example virtual interface utilizing a box-shape or pouch-shaped physical object, according to an example implementation of the present disclosure. For example in FIG. 5, virtual buttons 550 are generated and overlaid on a pouch 510 that has a substantially box-shape. The virtual interface controller 185 may detect that the pouch 510 has a box shape with a planar surface according to a shape of a hand 520, and generate the virtual buttons 550 on the planar surface of the pouch 510 in a similar manner with respect to FIGS. 4A-4D. Thus, the duplicated description thereof is omitted herein for the sake of brevity.

Figure 6A:
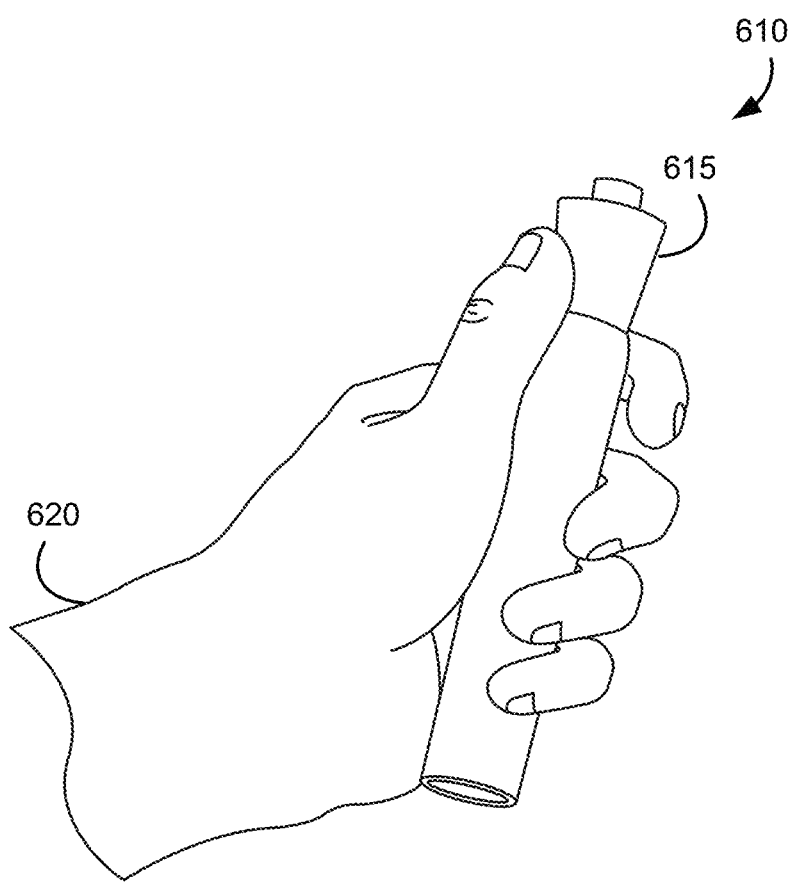
FIGS. 6A-6C show an example virtual interface utilizing a pen-shape physical object, according to an example implementation of the present disclosure.
Figure 6B:
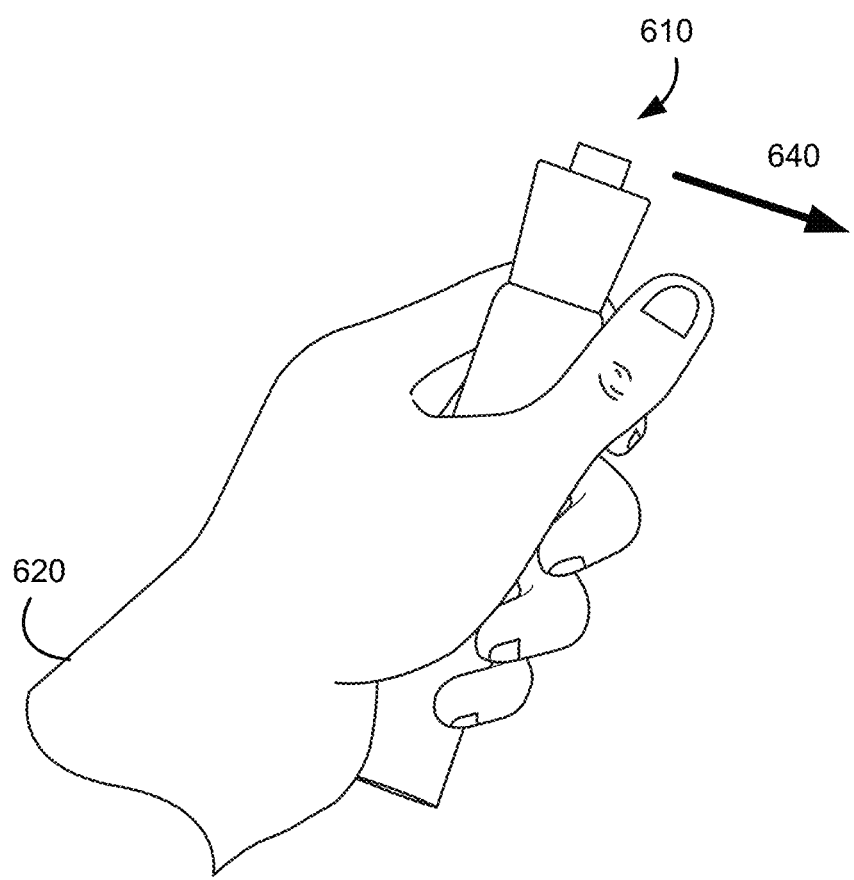
Figure 6C:
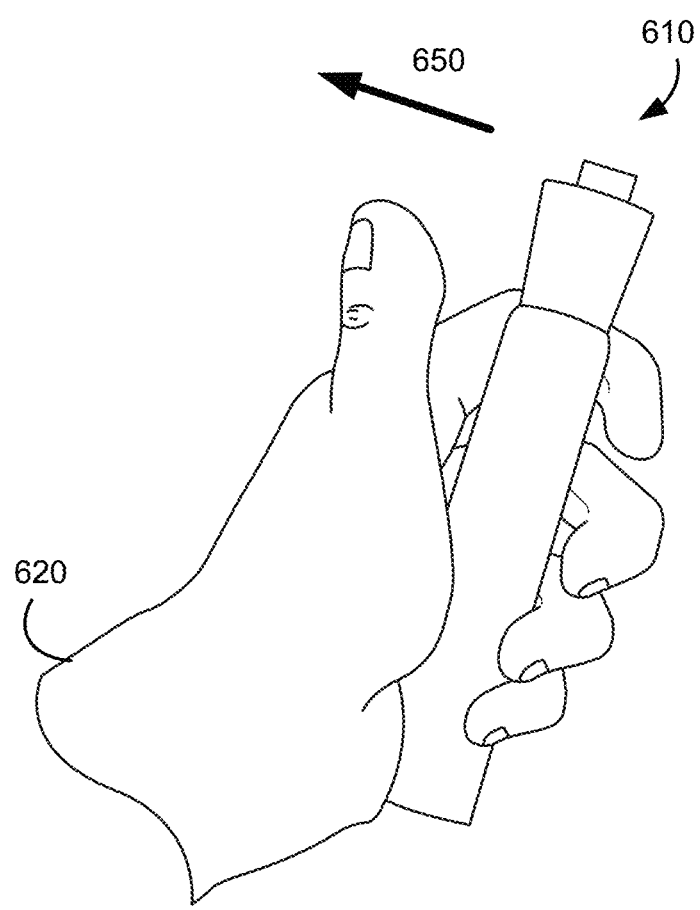

FIGS. 6A-6C show an example virtual interface utilizing a pen-shape physical object, according to an example implementation of the present disclosure. For example in FIG. 6A, a user may grab a pen 610, and tap a tip of the pen 610 twice for instance to activate an interactive feature. The virtual interface controller 185 may determine that the user is grabbing the pen 610 by detecting a shape of the hand 620 and by determining a hand template matching the detected shape of the hand 620. Moreover, the virtual interface controller 185 may determine that an activation event associated with a pen-shape object is tapping the tip 615 twice. The virtual interface controller 185 may activate an interactive feature for the pen 610, in response to detecting the user tapping the tip 615 twice. The interactive feature of the pen 610 may be a location or a direction of a thumb with respect to the pen 610. After the interactive feature is activated, the virtual interface controller 185 may track a location or a direction of the thumb with respect to the pen 610, and determine that the thumb is shifted to a right direction 640 with respect to the pen 610 as shown in FIG. 6B or shifted to a left direction 650 with respect to the pen 610 as shown in FIG. 6C. In one aspect, a user may swipe through or navigate through different content in a virtual reality or augmented reality application, according to the virtually created interactive feature based on the pen 610. In one aspect, a user may increase or decrease sound volume or brightness of virtual reality or augmented reality presented, according to the interactive feature based on the pen 610.

Figure 7A:
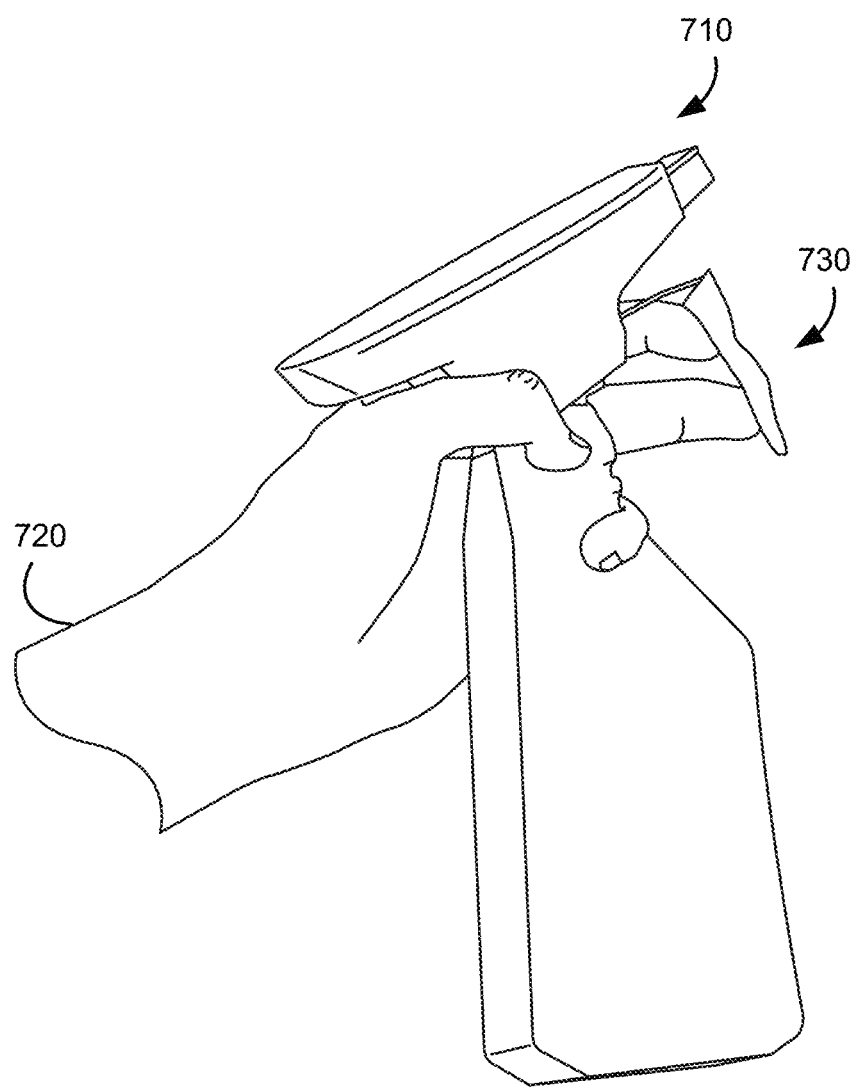
FIGS. 7A-7B show an example virtual interface utilizing a sprayer-shape physical object, according to an example implementation of the present disclosure.
Figure 7B:
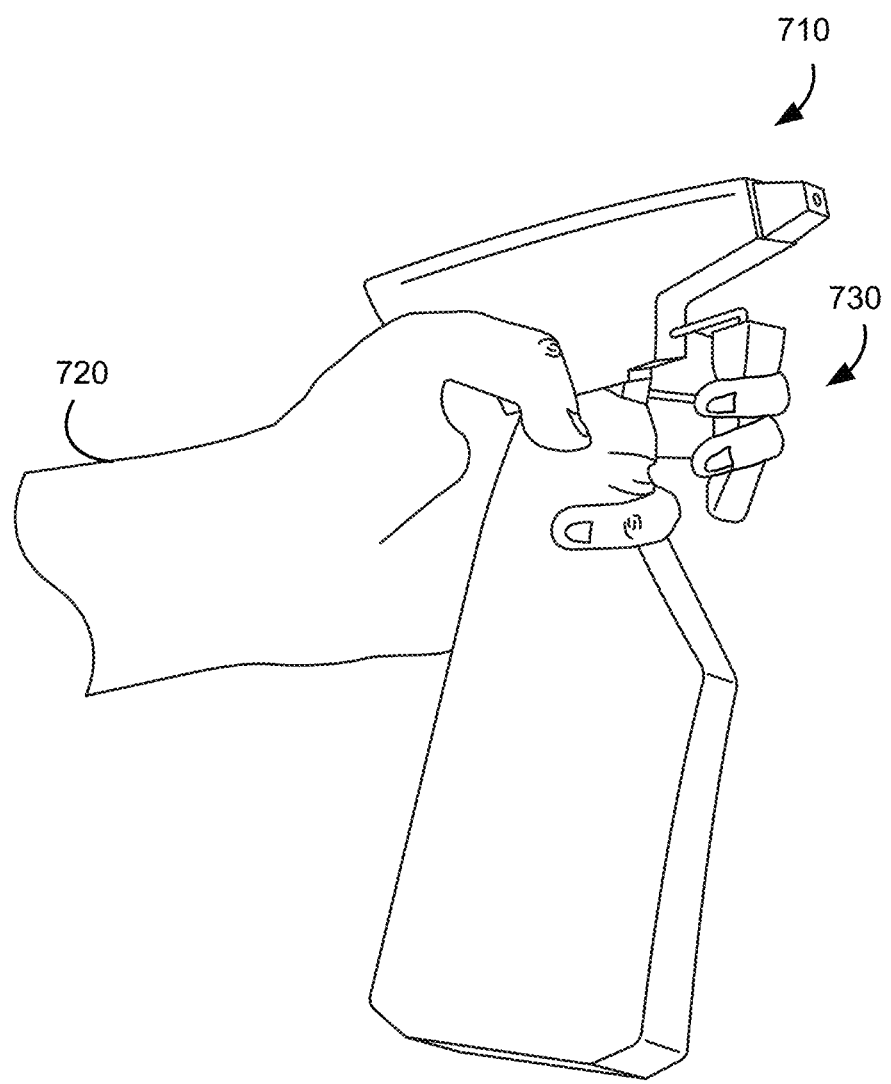

FIGS. 7A-7B show an example virtual interface utilizing a sprayer-shape physical object, according to an example implementation of the present disclosure. For example in FIG. 7A, a user may grab a sprayer 710, and pull a trigger 730 of the sprayer 710 twice to activate an interactive feature. The virtual interface controller 185 may determine that the user is grabbing the sprayer 710 by detecting a shape of the hand 720 and by determining a hand template matching the detected shape of the hand 720. Moreover, the virtual interface controller 185 may determine that an activation event associated with a sprayer-shape object is for instance pulling the trigger 730 twice. The virtual interface controller 185 may activate an interactive feature for the sprayer 710, in response to detecting the user pulling the trigger 730 twice. The interactive feature of the trigger 730 may be the user pulling the trigger 730. After the interactive feature is activated, the virtual interface controller 185 may track or determine a shape of the user hand, and determine that the trigger 730 is pulled according to the shape of the user hand with respect to the trigger 730 or a body of the sprayer 710 as shown in FIG. 7B. In one aspect, a laser beam or a bullet can be projected in a virtual reality or an augmented reality application, in response to the user pulling the trigger 730.

Figure 8:
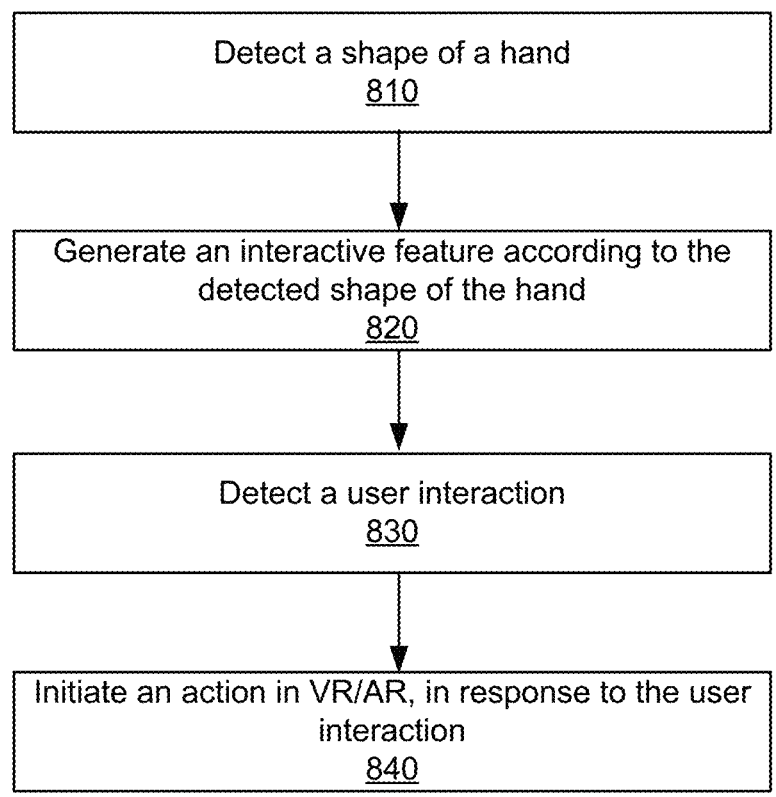
FIG. 8 is a flow chart illustrating a process of generating a virtual interface utilizing a physical object, according to an example implementation of the present disclosure.

FIG. 8 is a flow chart illustrating a process 800 of generating a virtual interface utilizing a physical object, according to an example implementation of the present disclosure. In some embodiments, the process 800 is performed by the virtual interface controller 185. In some embodiments, the process 800 is performed by other entities. In some embodiments, the process 800 includes more, fewer, or different steps than shown in FIG. 8.

In one approach, the virtual interface controller 185 detects 810 a shape of a hand. In one approach, the virtual interface controller 185 receives one or more images from the imaging sensors, and tracks a hand of the user to determine a shape of the hand. For example, the virtual interface controller 185 determines, identifies, detects, recognizes or extracts an outline and/or features (e.g., finger tips, finger joints, wrist, palm) of the hand from the received image, and identifies or tracks a shape of the hand according to the outline and/or the features of the hand. In one approach, the virtual interface controller 185 receives a signal indicating sensor measurements (e.g., translational movements and/or rotational movements) of different parts of a glove worn by a user through a communication link (e.g., a wireless link or a wired link). According to the signal indicating the sensor measurements, the virtual interface controller 185 may determine a location, an orientation, and/or a shape of the glove to determine a handshape.

In one approach, the virtual interface controller 185 generates 820 an interactive feature according to the detected shapes of the hand. In one approach, the virtual interface controller 185 determines a handshape template, from a plurality of handshape templates, closest or most aligned or conformed to the detected handshape. In one aspect, each template corresponds to a shape or a surface of a corresponding object. The virtual interface controller 185 may compare the detected handshape with the hand templates to identify or determine a hand template closest to the handshape, and determine a structure or a surface of the physical object being held according to the determined hand template. For example, the virtual interface controller 185 determines whether the physical object held has a cylindrical-shape, a box-shape, a pen-shape, or a sprayer-shape according to the hand template matching the detected handshape.

In one approach, the virtual interface controller 185 may generate or determine an activation event associated with the hand template, according to the hand template. An activation event may be a predetermined interaction by a user with a structure or a surface of a physical object that allows or causes an interactive feature to be generated. For example, an activation event may be a user providing a gesture of drawing a cross mark on a surface of a cylindrical shape object or a box-shape object. For another example, an activation event may be a user tapping a tip of a pen-shape object twice within a predetermined time (e.g., 1 second). For another example, an activation event may be a user pulling a trigger of a sprayer-shape object twice (e.g., 1 second).

In one approach, the virtual interface controller 185 generates or activates one or more interactive features for the virtual object, in response to detecting a user interaction matching the activation event associated with the hand template or the shape of the physical object. In one aspect, an interactive feature is a virtually created interface (or a virtual interface) that allows a user to interact with or trigger an action in a virtual reality or augmented reality application or change how the virtual reality or augmented reality application is rendered. In one example, a visible virtual interface includes a virtual button, a virtual keyboard, a virtual pad or other user interface element overlaid on the physical object. In one example, a non-visible virtual interface includes an interaction of the user associated with the physical object, such as a user pulling a trigger of a sprayer, or a location and/or direction of a finger with respect to a physical object. For example, a user may draw a cross mark with a first hand, while holding a physical object having a planar surface with a second hand, and a virtual pad or a virtual button can be generated and overlaid on the physical object. For example, a user may grab a pen and tap a tip of the pen twice rapidly (or within a predetermined duration) with a thumb, and a direction of the thumb with respect to the pen can be tracked. For example, a user may grab a sprayer and pull a trigger of the sprayer twice rapidly (or within a predetermined duration), and the handshape of the user with respect to the trigger or the body of the sprayer can be tracked or determined.

In one approach, the virtual interface controller 185 detects 830 a user interaction with an activated interactive feature of a physical object, and initiates 840 an action in a virtual reality or augmented reality application, in response to the detected user interaction with the activated interactive feature. For example, the virtual interface controller 185 determines whether a hand of the user presses a virtual button or a virtual pad, and inserts a corresponding number or a corresponding character, in response to determining that the hand presses the virtual button or the virtual pad. For example, the virtual interface controller 185 determines a direction and/or motion of the thumb with respect to a pen, and increases or decreases a volume of sound, or navigates through different content in the virtual reality or augmented reality application according to the direction of the thumb with respect to the pen. For example, the virtual interface controller 185 determines whether a trigger of a sprayer is pulled according to a tracked handshape with respect to the trigger or a body of the sprayer, and projects a bullet or a laser beam in a virtual reality or augmented reality game in response to detecting the user pulling the trigger.

Figure 9:
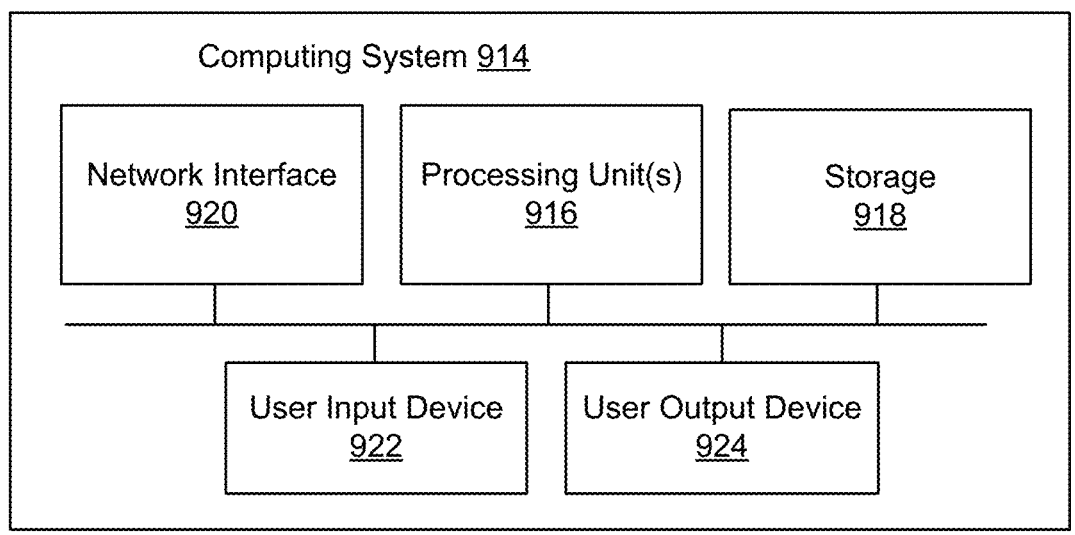
FIG. 9 is a block diagram of a computing environment according to an example implementation of the present disclosure.

Various operations described herein can be implemented on computer systems. FIG. 9 shows a block diagram of a representative computing system 914 usable to implement the present disclosure. In some embodiments, the console 110, the HWD 150 or both of FIG. 1 are implemented by the computing system 914. Computing system 914 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 914 can be implemented to provide VR, AR, MR experience. In some embodiments, the computing system 914 can include conventional computer components such as processors 916, storage device 918, network interface 920, user input device 922, and user output device 924.

Network interface 920 can provide a connection to a wide area network (e.g., the Internet) to which WAN interface of a remote server system is also connected. Network interface 920 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 922 can include any device (or devices) via which a user can provide signals to computing system 914; computing system 914 can interpret the signals as indicative of particular user requests or information. User input device 922 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 924 can include any device via which computing system 914 can provide information to a user. For example, user output device 924 can include a display to display images generated by or delivered to computing system 914. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 924 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 916 can provide various functionality for computing system 914, including any of the functionality described herein as being performed by a server or client, or other functionality associated with message management services.

It will be appreciated that computing system 914 is illustrative and that variations and modifications are possible. Computer systems used in connection with the present disclosure can have other capabilities not specifically described here. Further, while computing system 914 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A system comprising:
    a processor configured to:
        detect a shape of a hand of a user comprising a grip pose of the hand corresponding to a surface or a structure of a physical object,
        select a hand template from a plurality of hand templates according to the detected shape of the hand,
        determine a dimension and location of the physical object, according to the hand template,
        generate, according to the determined dimension and location of the physical object, an interactive feature for the surface or the structure of the physical object, in a virtual reality or augmented reality application,
        detect a user interaction with the interactive feature, and
        initiate an action of the virtual reality or augmented reality application, in response to detecting the user interaction with the interactive feature.

2. The system of claim 1, wherein the processor is configured to:
    detect a trajectory of a user finger on the surface of the physical object, and
    determine a curvature of the surface of the physical object, according to the detected trajectory, wherein the interactive feature in the virtual reality or augmented reality application is generated according to the determined curvature of the surface of the physical object.

3. The system of claim 1, further comprising:
    a storage configured to store mapping between the plurality of hand templates and corresponding interactive features,
    wherein the processor is configured to determine the interactive feature for the surface or the structure of the physical object according to the mapping.

4. The system of claim 1, wherein the processor is configured to generate, according to the detected shape of the hand, the interactive feature for the surface or the structure of the physical object, in the virtual reality or augmented reality application by:
detecting a predetermined interaction of the user associated with the physical object, and
activating the interactive feature, in response to detecting the predetermined interaction associated with the physical object.

5. The system of claim 4, wherein the predetermined interaction includes a drawing motion of a mark using another hand of the user, relative to the surface of the physical object.

6. The system of claim 5, wherein the processor is configured to activate the interactive feature by:
generating an image of a virtual button corresponding to the surface or the structure of the physical object, in response to detecting the drawing motion of the mark, and
overlaying the image of the virtual button on the surface or the structure of the physical object.

7. The system of claim 4, wherein the predetermined interaction comprises a tap by a finger of the hand on the surface of the physical object.

8. The system of claim 7, wherein the processor is configured to detect the user interaction with the interactive feature by:
tracking a position of the finger of the hand with respect to a location of the tap on the surface of the physical object.

9. The system of claim 4, wherein the predetermined interaction comprises pulling a trigger of the physical object a specific number of times within a time period.

10. The system of claim 9, wherein the processor is configured to detect the user interaction with the interactive feature by:
detecting whether the hand performs a motion to pull the trigger of the physical object.

11. A method comprising:
detecting a shape of a hand of a user comprising a grip pose of the hand corresponding to a surface or a structure of a physical object;
selecting a hand template of a plurality of hand templates according to the detected shape of the hand;
determining a dimension and location of the physical object, according to the hand template;
generating, according to the determined dimension and location of the physical object, an interactive feature for the surface or the structure of the physical object, in a virtual reality or augmented reality application;
detecting a user interaction with the interactive feature; and
initiating an action of the virtual reality or augmented reality application, in response to detecting the user interaction with the interactive feature.

12. The method of claim 11, further comprising:
detecting a trajectory of a user finger on the surface of the physical object, and
determining a curvature of the surface of the physical object, according to the detected trajectory, wherein the interactive feature in the virtual reality or augmented reality application is generated based on the determined curvature of the surface of the physical object.

13. The method of claim 11, further comprising:
storing mapping between the plurality of hand templates and corresponding interactive features,
wherein the interactive feature for the surface or the structure of the physical object is determined according to the mapping.

14. The method of claim 11, wherein generating, according to the detected shape of the hand, the interactive feature for the surface or the structure of the physical object, in the virtual reality or augmented reality application includes:
detecting a predetermined interaction of the user associated with the physical object, and
activating the interactive feature, in response to detecting the predetermined interaction associated with the physical object.

15. The method of claim 14, wherein the predetermined interaction is a drawing motion of a mark using another hand of the user, relative to the surface of the physical object.

16. The method of claim 15, wherein activating the interactive feature includes:
generating an image of a virtual button corresponding to the surface or the structure of the physical object, in response to detecting the drawing motion of the mark using the another hand of the user, and
overlaying the image of the virtual button on the surface or the structure of the physical object.

17. The method of claim 14, wherein the predetermined interaction comprises a tap by a finger of the hand on the surface of the physical object.

18. The method of claim 17, wherein detecting the user interaction with the interactive feature includes:
tracking a position of the finger of the hand with respect to a location of the tap on the surface of the physical object.

19. The method of claim 14, wherein the predetermined interaction includes pulling a trigger of the physical object a specific number of times within a time period.

20. The method of claim 19, wherein detecting the user interaction with the interactive feature includes:
detecting whether the hand performs a motion to pull the trigger of the physical object.

* * * * *